United States Patent [19]

Fleming

[11] 4,036,166

[45] July 19, 1977

[54] REMOTE HIGH TEMPERATURE INDICATING APPARATUS

[75] Inventor: William T. Fleming, Boonton, N.J.

[73] Assignee: Walter Kidde & Company, Inc., Belleville, N.J.

[21] Appl. No.: 665,516

[22] Filed: Mar. 10, 1976

[51] Int. Cl.² .......................................... G01K 11/06
[52] U.S. Cl. ................................................ 116/114.5
[58] Field of Search ................ 116/114 Y, 114.5, 101, 116/106

[56] References Cited

U.S. PATENT DOCUMENTS

| 2,363,711 | 11/1944 | Walsh | 116/114.5 |
| 2,532,510 | 12/1950 | Nelson | 116/114.5 X |

*Primary Examiner*—James J. Gill
*Attorney, Agent, or Firm*—Darby & Darby

[57] ABSTRACT

Apparatus for indicating at a visually accessible location remote from an object whether the temperature of that object is then at or has at some time exceeded a certain predetermined temperature including a sensor assembly adapted to be fastened to the object, an indicator assembly located in the visually accessible location and a transmission member connecting the sensor and indicator assemblies. The sensor assembly includes in the preferred embodiment a pair of members releasably secured to each other by a fusible material whose fusion temperature is approximately that of the predetermined temperature to be indicated. The indicator assembly includes a plunger slidably disposed within a housing normally hidden from view and biased towards an exposed position. The plunger is restrained from moving to this position by the transmission member which in the preferred embodiment includes an elongate flexible member having one end attached to the plunger and its other end connected to one of the sensor assembly members. Upon the object reaching the predetermined temperature, the fusible material melts releasing the flexible element which permits the plunger to move to its exposed position thereby indicating that the object has reached the predetermined temperature.

8 Claims, 2 Drawing Figures

REMOTE HIGH TEMPERATURE INDICATING APPARATUS

BACKGROUND OF THE INVENTION

This invention relates generally to temperature indicating apparatus, and more particularly to apparatus for indicating at a visually accessible location remote from an object whether the temperature of that object is then at or has at some time exceeded a predetermined high temperature.

Generally, it is often necessary to monitor the temperature of objects which are not easily accessible either visually or physically. For example, circumstances frequently dictate that containers in which high temperature exothermic chemical reactions are to occur be located in areas outside the view of the general public, and for that matter other personnel such as technicians. Under such circumstances, it is necessary to periodically check these containers to ascertain whether the chemical reaction might have prematurely occurred. In such cases, such a check often necessitates time-consuming dismantling of, for example, wall panels or other structural elements behind which the object is located.

One example of such a case is in the periodic inspection required of so-called oxygen generating "candles" which are standard equipment on many airlines. Such candles generally comprise cylindrical containers housing appropriate chemicals, normally separated by a pressure-sensitive valve or diaphragm, which chemicals when reacted with each other produce oxygen. During this reaction, the surface temperature of the container often reaches a temperature of between 500° and 600° F.

In the past, tape has been applied to the container wall, which tape has been chemically treated so that its color changes at elevated temperatures. However, since these candles are mounted behind panel enclosures, a "tape check" is a time-consuming procedure involving removal of the panel, especially in view of the fact that some aircraft provide individual candles for each passenger seat.

Other prior art temperature indicators have proven to be not entirely satisfactory for a variety of reasons. Often, these indicators require outside power from batteries or other sources. Where the objects whose temperatures are to be monitored remain obscured from view for long periods of time (such as in the case of the oxygen generating candles discussed above), the temperature indicating apparatus should, most desirably, be completely self-contained, requiring no outside power for its operation. Further, other proposed temperature indicating apparatus have been found to be unsatisfactory due to their complexity and amount of labor involved in installation.

Additionally, any such apparatus should be relatively light, inexpensive, unobtrusive and tamper-proof, i.e. cannot be inadvertently reset after actuation.

SUMMARY OF THE INVENTION

Accordingly, one object of this invention is to provide a new and improved apparatus for indicating at a visually accessible location whether the temperature of a remotely located object is or has at some time reached a predetermined high temperature.

Another object of the invention is the provision of a new and improved apparatus of the type set forth above which is self-contained in that it requires no external power source.

Still another object of the present invention is to provide a new and improved apparatus of the type described above which requires a minimum amount of labor for installation.

A further object of the instant invention is to provide a new and improved apparatus of the type described above which is relatively light, uncomplicated and inexpensive to manufacture.

A still further object of this invention is the provision of a new and improved apparatus of the type described above which cannot be inadvertently reset.

In accordance with a preferred embodiment of this invention, these and other objects are attained by providing an apparatus comprising a sensor assembly adapted to be fastened to the object comprising a pair of members secured to each other by a fusible material whose temperature of fusion is approximately that of the temperature to be sensed. The sensor assembly via a transmission member restrains a plunger hidden from view within a housing, which plunger and housing comprise an indicator assembly which is located in a visually accessible location. Upon the predetermined temperature being reached, the fusible material melts and allows the plunger to move out of its housing into an exposed position thereby indicating that the predetermined temperature has been reached.

DESCRIPTION OF THE DRAWINGS

A more complete appreciation of the invention and many of the attendant advantages thereof will be readily appreciated as the same becomes better understood by reference to the following detailed description when considered in connection with the accompanying drawings in which.

DESCRIPTION OF THE PREFERRED EMBODIMENT

Figure 1:
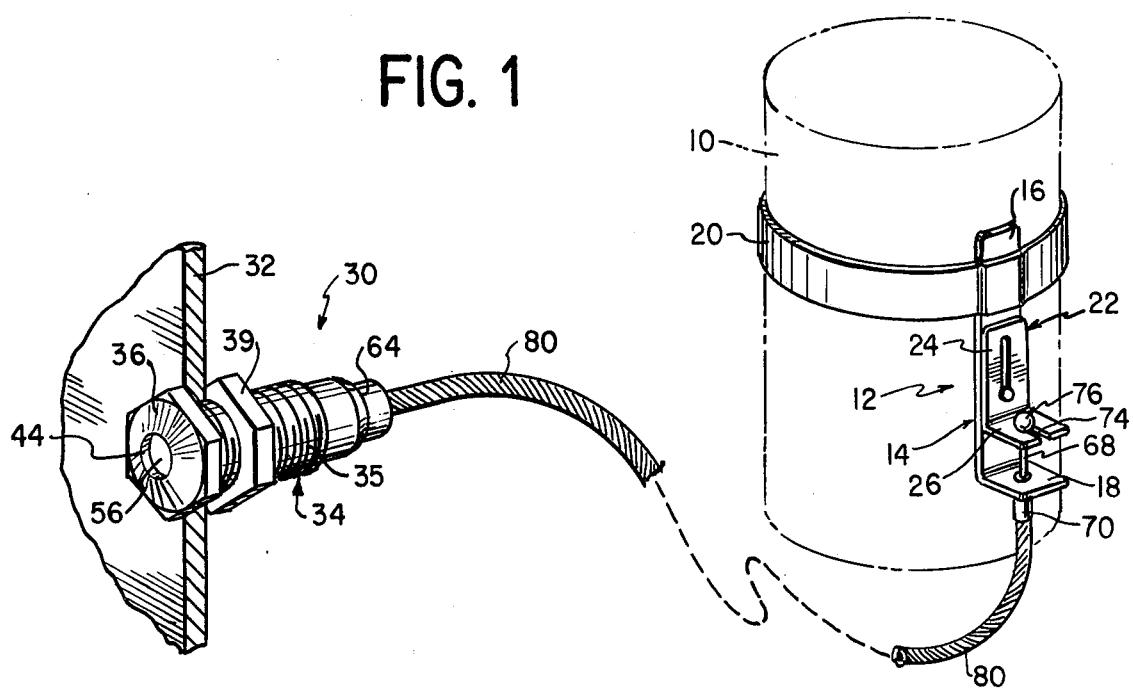
FIG. 1 is a perspective view, partially broken away, of the temperature indicating apparatus of the present invention.

Referring now to the drawings wherein like reference characters designate identical or corresponding parts throughout the several views, and more particularly to FIG. 1 thereof, a container 10 of an oxygen generating candle is shown in phantom and it is the temperature of the walls of this container (which indicates whether the oxygen generating chemical reaction has occurred) which is to be monitored.

It should be understood that although this description makes reference to the use of the invention with an oxygen generating candle, its use is not so restricted and may be used in connection with the monitoring of the temperature of any object within the limits of the fusion temperatures of the fusible materials used, as described below.

A sensor assembly, generally denoted as 12, includes a first substantially L-shaped bracket 14 having first and second legs 16, 18, respectively. First bracket 14 is fixed to the outer surface of container 10 by a strap 20 which overlies first leg 16 clamping the same to the container. Desirably, first leg 16 has a cross-sectional configuration which corresponds to that of container 10 to insure intimate contact between first bracket 14 and the container.

Bracket 14 is preferably formed of a relatively good heat conducting material such as aluminum so that there is a relatively small temperature lag between it and container 10.

A second substantially L-shaped bracket 22 is formed having a first leg 24 and a bifurcated second leg 26. Second bracket 22 is secured to first bracket 14 by a fusible material indicated as 28 (FIG. 2) with the first legs 16, 24 of the first and second brackets 14, 22 in contiguous relationship and in such a manner that the second legs 18, 26 of the first and second brackets are laterally spaced from each other as shown in FIG. 1 and in the solid lines of FIG. 2.

The fusible material 28 which secures the first and second brackets together is chosen preferably such that its fusion temperature is below the reaction temperature of the chemicals in container 10 but high enough so that it will remain in solid form under normal temperature conditions. Thus, in the case of oxygen generating candles where a typical chemical reaction occurs between 500° and 600° F., a eutectic solder such as a lead-tin (40% Pb, 60% Sn) solder having a melting temperature of about 370° F. would be appropriate.

As discussed above, the oxygen generating candle 10 is usually located behind removable panels which form the inner hull of an aircraft fuselage and are thus out of view of relevant personnel. It is an object of this invention to provide an indicator within the view of technicians and other such relevant personnel which, when viewed, readily indicates whether the oxygen generating chemical reaction has occurred. Towards this end, an indicator assembly generally denoted as 30 is provided in the panel 32 on the interior of an aircraft in a manner readily viewable by relevant personnel. Indicator assembly 30 includes a bushing 34 having an externally threaded shank 35 which passes through a panel opening 38 and an enlarged head 36 having an inner surface which is flush with the side of the panel facing the interior of the fuselage, which is a visually accessible location. Bushing 34 is fixed within panel opening 38 by a nut 39. An axial bore 40 is provided through bushing 34 having an enlarged diameter portion 42 and a reduced diameter portion 44, the latter opening into the fuselage interior.

A plunger 46 has a base portion 48 slidably disposed in the enlarged bore portion 42 and a reduced diameter extension 50 integral with base portion 48 which extends into reduced bore portion 44. Extension 50 has a bore 52 formed in it opening into the interiorly facing area and which narrows into a through passage 54 which extends through base portion 48. An indicator button 56 having a diameter preferably equal to the diameter of the plunger extension 50 is fixed over the plunger end by a pin 58 received within extension bore 52. The button is preferably of a readily noticeable color, such as red.

A coil spring 60 is disposed within the enlarged bore portion 42 of bushing 34 whose forward end bears against the rear face of the plunger base portion 48 while the rear end bears against the forward end of an insert 64 which closes the inner end of bore portion 42 and which is held in position by crimping the ends of bushing 34 against a conical shoulder formed on the plug. Spring 60 is normally compressed (as shown in FIG. 2) thereby exerting a force on plunger 46 tending to urge it to the left (as shown in FIG. 2).

Figure 2:
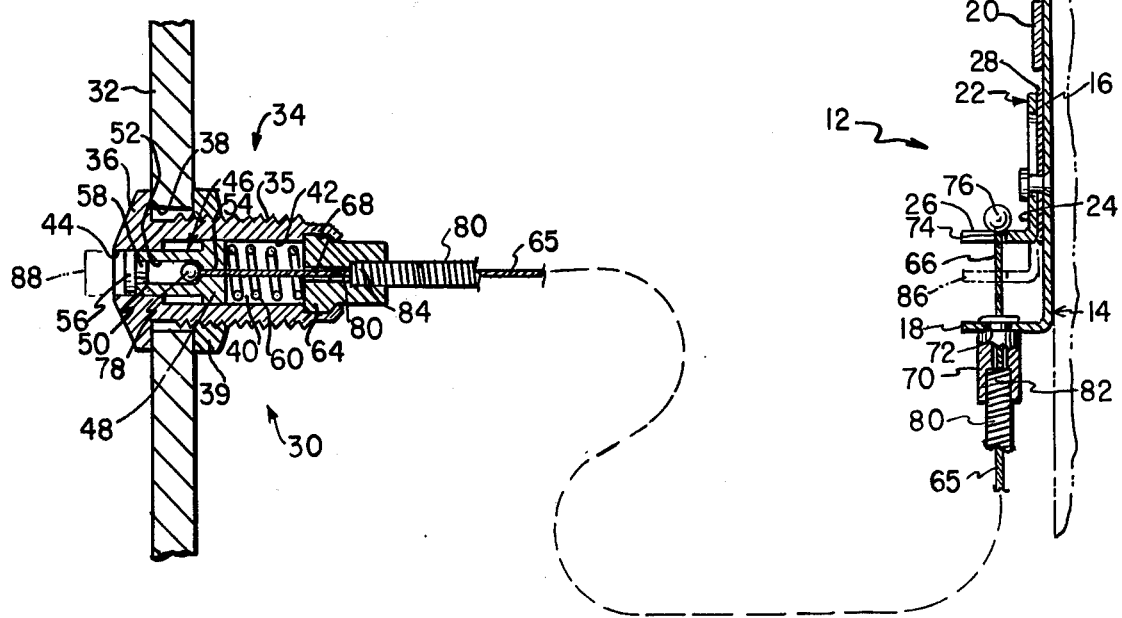
FIG. 2 is a side view in section, partially broken away, of the temperature indicating apparatus of the present invention.

A transmission member comprising an elongate flexible member normally retains the plunger 46 in a retracted position within bushing 34 such that the indicator button 56 is completely contained within reduced bore portion 44 as shown in FIGS. 1 and 2. In the preferred embodiment, this member comprises a braided wire cable 65 having first and second end portions 66, 68 operatively connected to the second bracket 22 and plunger 46, respectively, in a manner described below.

First cable end portion 66 passes through a collar 70 attached to the second leg 18 of first bracket 14, the collar having an axial bore which communicates with opening 72 formed in second leg 18. Cable end portion 66 extends through the space between second legs 18, 26 through an opening 74 in the bifurcated portion of second leg 26 of the second bracket 22 and is maintained in this position by a spherically shaped keeper 76 provided on the terminal end of first cable end portion 66.

Cable second end portion 68 passes through a bore 80 formed in plug 64, the center of coil spring 60 and opening 54 in plunger base portion 48 and is maintained in this position by a similarly spherically shaped keeper 78 provided on the terminal end of second cable end portion 68.

The length of cable 65 extending between first and second cable end portions 66, 68 is slidably enclosed within a helically wound cable shroud 80 having a first end 82 fixed within collar 70 and a second end 84 fixed within plug 64.

In the initial setup of the apparatus, the cable second end portion 68 is urged to the right (as seen in FIG. 2) thereby moving plunger 46 and cooperating button 56 into a completely enclosed position within bushing 34 against the force of spring 60. The plunger is retained in this position by drawing the first cable end portion 66 upwardly (as seen in FIG. 2) through opening 74 in the bifurcated second leg 26 of second bracket 22 until the cable is taut. Keeper 76 is then fixed on the end of first cable end portion 66 flush against second leg 26. The cable shroud 80 by virtue of its fixed ends 82, 84 permit cable 65 to be flexed into any desirable configuration.

In operation, under normal conditions, the second bracket 22 is fixed relative to container 10 through first bracket 14 to which it is attached via the fusible material 28. Thus, the indicator button 56 will remain withdrawn within the reduced bore portion 44 of bushing 34. However, should a chemical reaction be initiated within container 10, the temperature of which exceeds the predetermined melting temperature of fusible material 28, the fusible material will melt thereby releasing second bracket 22 which will move to a position denoted as 86 (FIG. 2) under the action of spring 60. This permits the plunger 46 to move to a position denoted 88 (FIG. 2) thereby exposing indicator button 58 to view thereby indicating initiation of the chemical reaction.

Thus, it can be seen that a completely self-contained temperature monitoring device which is independent of any outside power source is provided which is relatively simple in construction and which cannot be tampered with.

Obviously, numerous modifications and variations of the present invention are possible in light of the above teachings. It is therefore to be understood that within the scope of the appended claims the invention may be practiced otherwise than as specifically described herein.

What is claimed is:

1. Apparatus for indicating at a visually accessible location remote from an object whether the temperature of said object has at some time reached a predetermined high temperature comprising:

a sensor assembly including, a first bracket formed of a heat conducting material having first and second surfaces, said bracket adapted to be fixedly fastened to said object with said first surface thermally communicating with said object, a second bracket adjacent said second surface of said first bracket and adapted for movement in a predetermined direction relative to said first bracket, a fusible material having a fusion temperature in range including said predetermined high temperature, said fusible material joining said first and second brackets;

an elongated flexible member having a first end held in fixed relationship relative to said second bracket and terminating at a second end; and indicating means for indicating whether said first end is restrained relative to said first bracket including a housing having an opening, a plunger slidably contained within said housing movable between a first exposed position and a second position at least partially within said housing, a spring urging said plunger towards said exposed position, said spring also engaging said second end of said elongated flexible member and urging movement of said second bracket relative to said said base first bracket in said predetermined direction.

2. Apparatus as recited in claim 1 wherein said fusible material is a eutectic solder.

3. Apparatus as recited in claim 1 wherein said first bracket is substantially L-shaped having two legs, one of said legs being defined by said first and second surfaces, the other of said legs having an aperture formed therethrough through which said first end of said elongated flexible member passes.

4. Apparatus as recited in claim 1 wherein said second bracket is substantially L-shaped having two legs, one of said legs being contiguous with the second surface of said first bracket.

5. Apparatus as recited in claim 1 wherein said first bracket is substantially L-shaped having first and second legs, said first leg adapted to be contiguous with said object, said second leg having an aperture formed therethrough through which said first end of said elongated flexible member passes and wherein said second bracket is substantially L-shaped having first and second legs, said first legs of said first and second brackets being mutually contiguous and said second legs of said first and second brackets being spaced apart from each other.

6. Apparatus as recited in claim 5 wherein the first leg of said second bracket is bifurcated and said first end of said flexible elongated member has an enlarged portion retained by said bifurcated leg.

7. Apparatus as recited in claim 3 wherein said elongated flexible member includes a wire cable slidably disposed along its length within a shroud, said first and second ends of said flexible member comprising end portions of said cable which extend beyond the terminal ends of said shroud.

8. Apparatus for indicating at a visually accessible location remote from an object whether the temperature of said object has at some time reached a predetermined high temperature comprising:

a sensor assembly including, a first substantially L-shaped bracket adapted to be fixed to said object, having first and second legs, said first leg adapted to be contiguous with said object, said second leg having an aperture formed therethrough;

a second substantially L-shaped bracket having first and second legs, said first legs of said first and second brackets being secured to each other by a fusible material, said fusible material having a fusion temperature approximately equal to said predetermined high temperature, said second legs of said first and second brackets being spaced apart from each other;

an indicator assembly including, a housing having an open end extending into said visually accessible location, a plunger slidably contained within said housing movable between a first exposed position and a second position entirely contained within said housing, and spring means urging said plunger towards said first position;

an elongated flexible element including a wire cable having first and second terminal ends, said first end extending through said aperture in said first bracket second leg and coupled to said second bracket second leg, said second end being connected to said plunger normally restraining the same from moving to said first position, said wire cable being slidably disposed along its length within a shroud having first and second terminal ends spaced adjacent to and inwardly from said first and second cable ends respectively, the shroud first end being fixed to said first bracket second leg and the shroud second end being fixed to said housing.

* * * * *